(12) United States Patent
Li et al.

(10) Patent No.: US 9,469,724 B2
(45) Date of Patent: Oct. 18, 2016

(54) METHOD FOR SYNTHESIZING POLY(BUTYLENE SUCCINATE-CO-BUTYLENE ADIPATE)

(71) Applicant: Nanjing University, Nanjing (CN)

(72) Inventors: Hong Li, Nanjing (CN); Quanxing Zhang, Nanjing (CN); Na Cheng, Nanjing (CN); Tianrong Zhang, Nanjing (CN); Wei Jiang, Nanjing (CN); Bingcai Pan, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 14/965,873

(22) Filed: Dec. 10, 2015

(65) Prior Publication Data

US 2016/0096917 A1 Apr. 7, 2016

Related U.S. Application Data

(63) Continuation-in-part of application No. PCT/CN2015/084742, filed on Jul. 22, 2015.

(30) Foreign Application Priority Data

Jul. 22, 2014 (CN) .......................... 2014 1 0349247

(51) Int. Cl.
*C08G 63/02* (2006.01)
*C08G 63/16* (2006.01)
*C08G 63/85* (2006.01)
*C08G 63/87* (2006.01)

(52) U.S. Cl.
CPC ............... *C08G 63/16* (2013.01); *C08G 63/85* (2013.01); *C08G 63/87* (2013.01)

(58) Field of Classification Search
CPC ..................................................... C08G 63/16
USPC ........................................ 528/271, 272, 279
See application file for complete search history.

(56) References Cited

U.S. PATENT DOCUMENTS

2014/0303285 A1* 10/2014 Hou ...................... C08L 101/16
523/451

* cited by examiner

*Primary Examiner* — Terressa Boykin
(74) *Attorney, Agent, or Firm* — Matthias Scholl, PC; Matthias Scholl

(57) ABSTRACT

A method for synthesizing poly(butylene succinate-co-butylene adipate) (PBSA), including: a) adding raw materials including succinic acid, adipic acid, and 1,4-butanediol into a reaction still; increasing the temperature in the reaction still to 130° C., and stirring the raw materials, then keeping the temperature in the reaction still at 170-200° C., and dehydrating for 1-3 hours at atmospheric pressure, to yield an oligomer of PBSA; and b) decreasing the temperature of the reaction still to 100° C., and adding a composite catalyst system, the total addition of the composite catalyst system accounting for one ten-thousandth to one ten-millionth of a total weight percentage of the raw materials; uniformly stiffing and mixing the composite catalyst system and reactants, slowly vacuum pumping the reaction still, heating the reaction still to a temperature of 200-240° C. and allowing the composite catalyst system and the reactants to react for 10-20 hrs.

3 Claims, No Drawings

METHOD FOR SYNTHESIZING POLY(BUTYLENE SUCCINATE-CO-BUTYLENE ADIPATE)

CROSS-REFERENCE TO RELATED APPLICATIONS

This application is a continuation-in-part of International Patent Application No. PCT/CN2015/084742 with an international filing date of Jul. 22, 2015, designating the United States, now pending, and further claims priority benefits to Chinese Patent Application No. 201410349247.4 filed Jul. 22, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

1. Field of the Invention

The invention relates to a method for synthesizing biodegradable poly(butylene succinate-co-butylene adipate) (PBSA) using a composite biocompatible organic guanidine system as catalyst.

2. Description of the Related Art

Conventional synthetic methods of PBSA require a large amount of tetrabutyl titanate catalyst, and the resulting product has a poor color and lustre. In addition, the heavy metal catalyst tends to infiltrate the product and influence the thermal properties thereof.

SUMMARY OF THE INVENTION

In view of the above-described problems, it is one objective of the invention to provide a method for synthesizing poly(butylene succinate-co-butylene adipate) (PBSA) using biocompatible creatinine as catalyst.

To achieve the above objective, in accordance with one embodiment of the invention, there is provided a method for synthesizing poly(butylene succinate-co-butylene adipate) (PBSA) using biocompatible creatinine as catalyst. According to the method, succinic acid, adipic acid and 1,4-butanediol are used as raw materials, and a creatinine compound of a biocompatible organic guanidine (main catalyst) and an ortho-titanate system (cocatalyst) constitute a high-efficient composite catalyst system.

First, an oligomer (having a weight average molecular weight of 4000-6000 Da) of the PBSA is obtained by a dehydration polycondensation, then a copolymer of the PBSA is yielded via a dealcoholization transesterification.

The steps to synthesize the PBSA in accordance with one embodiment of the invention are as follows:

1) the dehydration polycondensation process: putting the raw materials (succinic acid, adipic acid and 1,4-butanediol) into a reaction still, a molar ratio of the succinic acid to the adipic acid being between 0.2:0.8 and 0.8:0.2, and a ratio of a mole number of the 1,4-butanediol to a total mole number of two carboxylic acids being between 1.05:1.0 and 1.5:1.0; increasing temperature in the reaction still to 130° C. under inert gas atmosphere, and stiffing the raw materials for complete dissolution, then keeping the temperature in the reaction still at 170-200° C., at atmospheric pressure, dehydrating the materials for 1-3 hours to yield an oligomer of the PBSA having a weight average molecular weight of 4000-6000 Da.

2) the dealcoholization transesterification process: decreasing the temperature of the reaction system to 100° C., and adding the composite catalyst system (a molar ratio of the main catalyst and the cocatalyst being 1:1) therein; total catalyst amount being one ten-thousandth to one ten-millionth of the total weight fraction of the raw materials; under inert gas atmosphere, stiffing and well-mixing the catalyst and reactant, then slowly vacuum pumping the reaction still until an absolute pressure under 200 Pa in 0.5-2 hrs, finally increasing the temperature to a 200-240° C. reaction temperature and reacting for 10-20 hrs to yield the copolymer PBSA having a weight average molecular weight over 100,000 Da.

In a class of this embodiment, the biocompatible organic guanidine as the main catalyst of the composite catalyst system is a creatinine compound selected from the group consisting of creatinine, creatinine hydrochloride, creatinine acetate, creatinine lactate, creatinine glycollate, creatinine benzoate, or a mixture thereof.

In a class of this embodiment, the ortho-titanate compound as the cocatalyst of the composite catalyst system is selected from the group consisting of tetraethyl orthotitanate (TEOT), tetrapropyl orthotitanate (TPOT), tetraisopropyl orthotitanate (TIOT), tetrabutyl orthotitanate (TBOT), tetratertbutyl orthotitanate (TTOT), or a mixture thereof.

Compared with existing technologies, advantages of the method for synthesizing PBSA according to embodiments of the invention are given below:

1. The main catalyst in the high-efficient composite catalyst system employs a creatinine compound of a biocompatible organic guanidine which is non-toxic and metal-free, thereby avoiding metal residue pollution to the polymer, and maintaining the thermal properties of the products.
2. The composite catalyst has high efficiency and low consumption. The added catalyst accounts only for one ten-thousandth to one ten-millionth of the raw materials, largely decreasing catalyst residues in the PBSA copolymer, enhancing the thermal stability of the materials, and widening the application of PBSA in fields of food and medical materials.

DETAILED DESCRIPTION OF THE EMBODIMENTS

For further illustrating the invention, experiments detailing a method for synthesizing poly(butylene succinate-co-butylene adipate) (PBSA) using a biocompatible creatinine as a catalyst are described below. It should be noted that the following examples are intended to describe and not to limit the invention.

Example 1

Raw materials (succinic acid, adipic acid, and 1,4-butanediol) are put into a reaction still, with a molar ratio of the succinic acid to the adipic acid being 0.2:0.8, and a ratio of a mole number of the 1,4-butanediol to a total mole number of the two carboxylic acids being 1.05:1.0. Temperature in the reaction still is increased to 130° C. under inert gas atmosphere, and raw materials are stirred for complete dissolution, then in the reaction still the temperature is kept at 170° C., at atmospheric pressure, the materials are dehydrated for 3 hours to yield an oligomer of the PBSA having a weight average molecular weight of 4,000 Da.

Then the temperature of the reaction system is decreased to 100° C., and a composite catalyst system (a main catalyst being creatinine, a cocatalyst being tetraethyl orthotitanate (TEOT), and a molar ratio being 1:1) is added therein. Total catalyst amount is one ten-thousandth of the total weight fraction of the raw materials. Under inert gas atmosphere, the catalyst and reactant are stirred and uniformly mixed, then the reaction still is slowly vacuum pumped until an absolute pressure is under 200 Pa over half an hour, finally the temperature is increased to a 200° C. reaction temperature and the reaction lasts for 20 hours to yield the PBSA copolymer with a weight average molecular weight of 115,000 Da.

Example 2

Raw materials (succinic acid, adipic acid, and 1,4-butanediol) are put into a reaction still, with the molar ratio of the succinic acid to the adipic acid being 0.4:0.6, and the ratio of an added mole number of the 1,4-butanediol to a total mole number of the two carboxylic acids being 1.1:1.0. Temperature in the reaction still is increased to 130° C. under inert gas atmosphere, and raw materials are stirred for complete dissolution, then in the reaction still the temperature is kept at 180° C., at atmospheric pressure, the materials are dehydrated for 2 hours to yield an oligomer of the PBSA having a weight average molecular weight of 4,500 Da.

Then the temperature of the reaction system is decreased to 100° C., and a composite catalyst system (the main catalyst being creatinine hydrochloride, the cocatalyst being tetraethyl orthotitanate (TEOT), and the molar ratio being 1:1) is added therein. Total catalyst amount is five hundred-thousandth of the total weight fraction of the raw materials. Under inert gas atmosphere, the catalyst and reactant are stirred and uniformly mixed, then the reaction still is slowly vacuum pumped until an absolute pressure is under 200 Pa in an hour, finally the temperature is increased to a 210° C. reaction temperature and the reaction lasts for 15 hours to yield the PBSA copolymer with a weight average molecular weight of 103,000 Da.

Example 3

Raw materials (succinic acid, adipic acid and 1,4-butanediol) are put into a reaction still, with the molar ratio of the succinic acid to the adipic acid being 0.5:0.5, and the ratio of an added mole number of the 1,4-butanediol to a total mole number of the two carboxylic acids being 1.2:1.0. Temperature in the reaction still is increased to 130° C. under inert gas atmosphere, and raw materials are stirred for complete dissolution, then in the reaction still the temperature is kept at 190° C., at atmospheric pressure, the materials are dehydrated for one hour to yield an oligomer of the PBSA having a weight average molecular weight of 5,000 Da.

Then the temperature of the reaction system is decreased to 100° C., and a composite catalyst system (the main catalyst being creatinine acetate, the cocatalyst being tetrapropyl orthotitanate (TPOT), and the molar ratio being 1:1) is added therein. Total catalyst amount is one hundred-thousandth of the total weight fraction of the raw materials. Under inert gas atmosphere, the catalyst and reactant are stirred and uniformly mixed, then the reaction still is slowly vacuum pumped until an absolute pressure is under 200 Pa in an hour and a half, finally the temperature is increased to a 220° C. reaction temperature and the reaction lasts for 15 hours to yield the PBSA copolymer with a weight average molecular weight of 128,000 Da.

Example 4

Raw materials (succinic acid, adipic acid, and 1,4-butanediol) are put into a reaction still, with the molar ratio of the succinic acid to the adipic acid being 0.6:0.4, and the ratio of an added mole number of the 1,4-butanediol to a total mole number of the two carboxylic acids being 1.3:1.0. Temperature in the reaction still is increased to 130° C. under inert gas atmosphere, and raw materials are stirred for complete dissolution, then in the reaction still the temperature is kept at 200° C., at atmospheric pressure, the materials are dehydrated for two hours to yield an oligomer of the PBSA having a weight average molecular weight of 5,500 Da.

Then the temperature of the reaction system is decreased to 100° C., and a composite catalyst system (the main catalyst being creatinine lactate, the cocatalyst being tetraisopropyl orthotitanate (TIOT), and the molar ratio being 1:1) is added therein. Total catalyst amount is five millionth of the total weight fraction of the raw materials. Under inert gas atmosphere, the catalyst and reactant are stirred and uniformly mixed, then the reaction still is slowly vacuum pumped until an absolute pressure is under 200 Pa in two hours, finally the temperature is increased to a 230° C. reaction temperature and the reaction lasts for 20 hours to yield the PBSA copolymer with a weight average molecular weight of 126,000 Da.

Example 5

Raw materials (succinic acid, adipic acid, and 1,4-butanediol) are put into a reaction still, with the molar ratio of the succinic acid to the adipic acid being 0.8:0.2, and the ratio of an added mole number of the 1,4-butanediol to a total mole number of the two carboxylic acids being 1.4:1.0. Temperature in the reaction still is increased to 130° C. under inert gas atmosphere, and raw materials are stirred for complete dissolution, then in the reaction still the temperature is kept at 190° C., at atmospheric pressure, the materials are dehydrated for one hour to yield an oligomer of the PBSA having a weight average molecular weight of 5,000 Da.

Then the temperature of the reaction system is decreased to 100° C., and a composite catalyst system (the main catalyst being creatinine glycollate, the cocatalyst being tetrabutyl orthotitanate (TBOT), and the molar ratio being 1:1) is added therein. Total catalyst amount is one millionth of the total weight fraction of the raw materials. Under inert gas atmosphere, the catalyst and reactant are stirred and uniformly mixed, then the reaction still is slowly vacuum pumped until an absolute pressure is under 200 Pa in one hour and a half, finally the temperature is increased to a 240° C. reaction temperature and the reaction lasts for 10 hours to yield the PBSA copolymer with a weight average molecular weight of 108,000 Da.

Example 6

Raw materials (succinic acid, adipic acid, and 1,4-butanediol) are put into a reaction still, with the molar ratio of the succinic acid to the adipic acid being 0.6:0.4, and the ratio of an added mole number of the 1,4-butanediol to a total mole number of the two carboxylic acids being 1.5:1.0.

Temperature in the reaction still is increased to 130° C. under inert gas atmosphere, and raw materials are stirred for complete dissolution, then in the reaction still the temperature is kept at 200° C., at atmospheric pressure, the materials are dehydrated for three hours to yield an oligomer of the PBSA having a weight average molecular weight of 6,000 Da.

Then the temperature of the reaction system is decreased to 100° C., and a composite catalyst system (the main catalyst being creatinine benzoate, the cocatalyst being tetratertbutyl orthotitanate (TTOT), and the molar ratio being 1:1) is added therein. Total catalyst amount is five ten-millionth of the total weight fraction of the raw materials. Under inert gas atmosphere, the catalyst and reactant are stirred and uniformly mixed, then the reaction still is slowly vacuum pumped until an absolute pressure is under 200 Pa in one hour and a half, finally the temperature is increased to a 220° C. reaction temperature and the reaction lasts for 15 hours to yield the PBSA copolymer with a weight average molecular weight of 124,000 Da.

Example 7

Raw materials (succinic acid, adipic acid, and 1,4-butanediol) are put into a reaction still, with the molar ratio of the succinic acid to the adipic acid being 0.5:0.5, and the ratio of an added mole number of the 1,4-butanediol to a total mole number of the two carboxylic acids being 1.2:1.0. Temperature in the reaction still is increased to 130° C. under inert gas atmosphere, and raw materials are stirred for complete dissolution, then in the reaction still the temperature is kept at 180° C., at atmospheric pressure, the materials are dehydrated for two hours to yield an oligomer of the PBSA having a weight average molecular weight of 5,000 Da.

Then the temperature of the reaction system is decreased to 100° C., and a composite catalyst system (the main catalyst being creatinine, the cocatalyst being tetrapropyl orthotitanate (TPOT), and the molar ratio being 1:1) is added therein. Total catalyst amount is one ten-millionth of the total weight fraction of the raw materials. Under inert gas atmosphere, the catalyst and reactant are stirred and uniformly mixed, then the reaction still is slowly vacuum pumped until an absolute pressure is under 200 Pa in half an hour, finally the temperature is increased to a 220° C. reaction temperature and the reaction lasts for 15 hours to yield the PBSA copolymer with a weight average molecular weight of 118,000 Da.

Example 8

Raw materials (succinic acid, adipic acid, and 1,4-butanediol) are put into a reaction still, with the molar ratio of the succinic acid to the adipic acid being 0.4:0.6, and the ratio of an added mole number of the 1,4-butanediol to a total mole number of the two carboxylic acids being 1.1:1.0. Temperature in the reaction still is increased to 130° C. under inert gas atmosphere, and raw materials are stirred for complete dissolution, then in the reaction still the temperature is kept at 180° C., at atmospheric pressure, the materials are dehydrated for three hours to yield an oligomer of the PBSA having a weight average molecular weight of 4,500 Da.

Then the temperature of the reaction system is decreased to 100° C., and a composite catalyst system (the main catalyst being creatinine and creatinine hydrochloride, the cocatalyst being tetraethyl orthotitanate (TEOT), tetrapropyl orthotitanate (TPOT), and tetraisopropyl orthotitanate (TIOT), and the molar ratio of the five being 1:1:1:1:1) is added therein. Total catalyst amount is five ten millionth of the total weight fraction of the raw materials. Under inert gas atmosphere, the catalyst and reactant are stirred and uniformly mixed, then the reaction still is slowly vacuum pumped until an absolute pressure is under 200 Pa in an hour, finally the temperature is increased to a 230° C. reaction temperature and the reaction lasts for 15 hours to yield the PBSA copolymer with a weight average molecular weight of 122,000 Da.

Example 9

Raw materials (succinic acid, adipic acid, and 1,4-butanediol) are put into a reaction still, with the molar ratio of the succinic acid to the adipic acid being 0.2:0.8, and the ratio of an added mole number of the 1,4-butanediol to a total mole number of the two carboxylic acids being 1.05:1.0. Temperature in the reaction still is increased to 130° C. under inert gas atmosphere, and raw materials are stirred for complete dissolution, then in the reaction still the temperature is kept at 170° C., at atmospheric pressure, the materials are dehydrated for three hours to yield an oligomer of the PBSA having a weight average molecular weight of 4,000 Da.

Then the temperature of the reaction system is decreased to 100° C., and a composite catalyst system (the main catalyst being creatinine acetate, the cocatalyst being tetrapropyl orthotitanate (TPOT), tetraisopropyl orthotitanate (TIOT), tetrabutyl orthotitanate (TBOT), and tetratertbutyl orthotitanate (TTOT), and the molar ratio of the five being 1:1:1:1:1) is added therein. Total catalyst amount is one millionth of the total weight fraction of the raw materials. Under inert gas atmosphere, the catalyst and reactant are stirred and uniformly mixed, then the reaction still is slowly vacuum pumped until an absolute pressure is under 200 Pa in an hour and a half, finally the temperature is increased to a 210° C. reaction temperature and the reaction lasts for 12 hours to yield the PBSA copolymer with a weight average molecular weight of 113,000 Da.

Example 10

Raw materials (succinic acid, adipic acid, and 1,4-butanediol) are put into a reaction still, with the molar ratio of the succinic acid to the adipic acid being 0.4:0.6, and the ratio of an added mole number of the 1,4-butanediol to a total mole number of the two carboxylic acids being 1.05:1.0. Temperature in the reaction still is increased to 130° C. under inert gas atmosphere, and raw materials are stirred for complete dissolution, then in the reaction still the temperature is kept at 175° C., at atmospheric pressure, the materials are dehydrated for two hours and a half to yield an oligomer of the PBSA having a weight average molecular weight of 4,800 Da.

Then the temperature of the reaction system is decreased to 100° C., and a composite catalyst system(the main catalyst being creatinine lactate, creatinine glycollate, and creatinine benzoate, the cocatalyst being tetrapropyl orthotitanate (TPOT), tetrabutyl orthotitanate (TBOT), and the molar ratio of the five being 1:1:1:1:1) is added therein. Total catalyst amount is five millionth of the total weight fraction of the raw materials. Under inert gas atmosphere, the catalyst and reactant are stirred and uniformly mixed, then the reaction still is slowly vacuum pumped until an absolute pressure is under 200 Pa in half an hour, finally the temperature is increased to a 240° C. reaction temperature and the reaction lasts for 10 hours to yield the copolymer PBSA having a weight average molecular weight of 134,000 Da.

Example 11

Raw materials (succinic acid, adipic acid, and 1,4-butanediol) are put into a reaction still, with the molar ratio of the succinic acid to the adipic acid being 0.5:0.5, and the ratio of an added mole number of the 1,4-butanediol to a total mole number of the two carboxylic acids being 1.4:1.0. Temperature in the reaction still is increased to 130° C. under inert gas atmosphere, and raw materials are stirred for complete dissolution, then in the reaction still the temperature is kept at 180° C., at atmospheric pressure, the materials are dehydrated for three hours to yield an oligomer of the PBSA having a weight average molecular weight of 5,000 Da.

Then the temperature of the reaction system is decreased to 100° C., and a composite catalyst system (the main catalyst being creatinine, creatinine hydrochloride, creatinine glycollate, and creatinine benzoate, the cocatalyst being tetratertbutyl orthotitanate (TTOT, and the molar ratio of the five being 1:1:1:1:1) is added therein. Total catalyst amount is one hundred-thousandth of the total weight fraction of the raw materials. Under inert gas atmosphere, the catalyst and reactant are stirred and uniformly mixed, then the reaction still is slowly vacuum pumped until an absolute pressure is under 200 Pa in two hours, finally the temperature is increased to a 220° C. reaction temperature and the reaction lasts for 14 hours to yield the copolymer PBSA having a weight average molecular weight of 119,000 Da.

Example 12

Raw materials (succinic acid, adipic acid, and 1,4-butanediol) are put into a reaction still, with the molar ratio of the succinic acid to the adipic acid being 0.5:0.5, and the ratio of an added mole number of the 1,4-butanediol to a total mole number of the two carboxylic acids being 1.5:1.0. Temperature in the reaction still is increased to 130° C. under inert gas atmosphere, and raw materials are stirred for complete dissolution, then in the reaction still the temperature is kept at 200° C., at atmospheric pressure, the materials are dehydrated for two hours to yield an oligomer of the PBSA having a weight average molecular weight of 5,500 Da.

Then the temperature of the reaction system is decreased to 100° C., and a composite catalyst system (the main catalyst being creatinine, creatinine hydrochloride, creatinine acetate, the cocatalyst being tetraethyl orthotitanate (TEOT), tetrapropyl orthotitanate (TPOT), tetraisopropyl orthotitanate (TIOT), tetrabutyl orthotitanate (TBOT), and the molar ratio of the seven being 1:1:1:1:1:1:1) is added therein. Total catalyst amount is one hundred-thousandth of the total weight fraction of the raw materials. Under inert gas atmosphere, the catalyst and reactant are stirred and uniformly mixed, then the reaction still is slowly vacuum pumped until an absolute pressure is under 200 Pa in half an hour, finally the temperature is increased to a 240° C. reaction temperature and the reaction lasts for 12 hours to yield the PBSA copolymer with a weight average molecular weight of 120,000 Da.

Example 13

Raw materials (succinic acid, adipic acid, and 1,4-butanediol) are put into a reaction still, with the molar ratio of the succinic acid to the adipic acid being 0.6:0.4, and the ratio of an added mole number of the 1,4-butanediol to a total mole number of the two carboxylic acids being 1.5:1.0. Temperature in the reaction still is increased to 130° C. under inert gas atmosphere, and raw materials are stirred for complete dissolution, then in the reaction still the temperature is kept at 180° C., at atmospheric pressure, the materials are dehydrated for three hours to yield an oligomer of the PBSA having a weight average molecular weight of 5,100 Da.

Then the temperature of the reaction system is decreased to 100° C., and a composite catalyst system(the main catalyst being creatinine glycollate, and creatinine benzoate, the cocatalyst being tetraethyl orthotitanate (TEOT), tetrapropyl orthotitanate (TPOT), tetraisopropyl orthotitanate (TIOT), tetrabutyl orthotitanate (TBOT), and tetratertbutyl orthotitante (TTOT), and the molar ratio between the seven being 1:1:1:1:1:1:1) is added therein. Total catalyst amount is one hundred thousandth of the total weight fraction of the raw materials. Under inert gas atmosphere, the catalyst and reactant are stirred and uniformly mixed, then the reaction still is slowly vacuum pumped until an absolute pressure is under 200 Pa in one hour and a half, finally the temperature is increased to a 200° C. reaction temperature and the reaction lasts for 20 hours to yield the copolymer PBSA having a weight average molecular weight of 116,000 Da.

Example 14

Raw materials (succinic acid, adipic acid, and 1,4-butanediol) are put into a reaction still, with the molar ratio of the succinic acid to the adipic acid being 0.8:0.2, and the ratio of an added mole number of the 1,4-butanediol to a total mole number of the two carboxylic acids being 1.2:1.0. Temperature in the reaction still is increased to 130° C. under inert gas atmosphere, and raw materials are stirred for complete dissolution, then in the reaction still the temperature is kept at 170° C., at atmospheric pressure, the materials are dehydrated for three hours to yield an oligomer of the PBSA having a weight average molecular weight of 4,400 Da.

Then the temperature of the reaction system is decreased to 100° C., and a composite catalyst system (the main catalyst being creatinine, creatinine hydrochloride, creatinine acetate, creatinine lactate, creatinine glycollate, and creatinine benzoate, the cocatalyst being tetrapropyl orthotitanate (TPOT), and the molar ratio of the seven being 1:1:1:1:1:1:1) is added therein. Total catalyst amount is five millionth of the total weight fraction of the raw materials. Under inert gas atmosphere, the catalyst and reactant are stirred and uniformly mixed, then the reaction still is slowly vacuum pumped until an absolute pressure is under 200 Pa in one hour, finally the temperature is increased to a 230° C. reaction temperature and the reaction lasts for 15 hours to yield the PBSA copolymer with a weight average molecular weight of 125,000 Da.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for synthesizing poly(butylene succinate-co-butylene adipate) (PBSA), comprising:

a) adding raw materials comprising succinic acid, adipic acid, and 1,4-butanediol to a reaction still, a molar ratio of the succinic acid to the adipic acid being between 0.2:0.8 and 0.8:0.2, and a ratio of a mole number of the 1,4-butanediol to a total mole number of two carboxylic acids being between 1.05:1.0 and 1.5:1.0; increasing a temperature in the reaction still to 130° C. under inert gas atmosphere, and stiffing the raw materials for complete dissolution, then keeping the temperature in the reaction still at a temperature of 170-200° C., and dehydrating for 1-3 hours at atmospheric pressure, to yield an oligomer of PBSA with a weight average weight average molecular weight of 4000-6000 Da; and b) decreasing the temperature of the reaction still to 100° C., and adding a composite catalyst system comprising a main catalyst and a cocatalyst with a molar ratio thereof being 1:1, the main catalyst being a biocompatible organic guanidine, the cocatalyst being an ortho-titanate compound, and a total addition of the composite catalyst system accounting for one ten-thousandth to one ten-millionth of a total weight percentage of the raw materials; uniformly stiffing and mixing the composite catalyst system and reactants under the inert gas atmosphere, slowly vacuum pumping the reaction still for 0.5-2 hrs until an absolute pressure therein is below 200 Pa, heating the reaction still to a temperature of 200-240° C. and allowing the composite catalyst system and the reactants to react for 10-20 hrs, to yield a copolymer of PBSA having a weight average molecular weight over 100,000 Da.

2. The method of claim 1, wherein the biocompatible organic guanidine as the main catalyst of the composite catalyst system is a creatinine compound selected from the group consisting of creatinine, creatinine hydrochloride, creatinine acetate, creatinine lactate, creatinine glycollate, creatinine benzoate, or a mixture thereof.

3. The method of claim 1, wherein the ortho-titanate compound as the cocatalyst of the composite catalyst system is selected from the group consisting of tetraethyl orthotitanate (TEOT), tetrapropyl orthotitanate (TPOT), tetraisopropyl orthotitanate (TIOT), tetrabutyl orthotitanate (TBOT), tetratertbutyl orthotitanate (TTOT), or a mixture thereof.

* * * * *